(12) United States Patent
Delbaere et al.

(10) Patent No.: US 8,760,614 B2
(45) Date of Patent: Jun. 24, 2014

(54) OPTICAL BIOMETRIC SECURITY ELEMENT

(75) Inventors: Fabien Xavier Delbaere, Flaxlanden (FR); Hubert Seiberle, Weil am Rhein (DE); Peggy Studer, Buschwiller (FR)

(73) Assignee: Rolic Ltd., Zug (CH)

( * ) Notice: Subject to any disclaimer, the term of this patent is extended or adjusted under 35 U.S.C. 154(b) by 777 days.

(21) Appl. No.: 12/922,435

(22) PCT Filed: Mar. 6, 2009

(86) PCT No.: PCT/EP2009/001620
§ 371 (c)(1),
(2), (4) Date: Sep. 13, 2010

(87) PCT Pub. No.: WO2009/112206
PCT Pub. Date: Sep. 17, 2009

(65) Prior Publication Data
US 2011/0017838 A1    Jan. 27, 2011

(30) Foreign Application Priority Data
Mar. 11, 2008   (EP) ...................................... 08102514

(51) Int. Cl.
*G02F 1/13* (2006.01)
*G02F 1/1337* (2006.01)

(52) U.S. Cl.
USPC ............ 349/200; 349/123; 349/129; 349/183

(58) Field of Classification Search
USPC ............. 349/1, 123, 129, 158, 164, 183, 187, 349/12; 427/7; 106/31.13, 31.14; 283/75, 283/78, 90, 91, 93, 114
See application file for complete search history.

(56) References Cited

U.S. PATENT DOCUMENTS

| | | | |
|---|---|---|---|
| 5,593,617 A | 1/1997 | Kelly et al. | |
| 5,798,147 A * | 8/1998 | Beck et al. | 427/511 |
| 6,144,428 A | 11/2000 | Schadt et al. | |
| 6,496,239 B2 | 12/2002 | Seiberle | |
| 7,009,190 B1 | 3/2006 | Stephenson, III et al. | |
| 7,128,258 B1 | 10/2006 | Harper | |
| 7,201,948 B2 | 4/2007 | Moia et al. | |
| 2002/0033117 A1* | 3/2002 | Inoue et al. | 106/31.68 |

(Continued)

FOREIGN PATENT DOCUMENTS

DE   24 52 202 A1   11/1975
EP    1 335 217 A2    8/2003

(Continued)

OTHER PUBLICATIONS

Masaki Hashiyada, Development of Biometric DNA Ink for Authentication Security, Tohoku J. Exp Med., 2004, pp. 109-117.

(Continued)

*Primary Examiner* — Dung Nguyen
*Assistant Examiner* — Tai Duong
(74) *Attorney, Agent, or Firm* — Sughrue Mion, PLLC

(57) ABSTRACT

This invention relates to an optical element for the purpose of identification and/or prevention of forgery or copying, including at least one layer with anisotropic optical properties, wherein the anisotropic optical properties are patterned, characterized in that the pattern represents biometric information. In addition, this invention relates to a method for the preparation of an optical element for the purpose of identification and/or prevention of forgery or copying.

19 Claims, 4 Drawing Sheets

(56) References Cited

U.S. PATENT DOCUMENTS

| | | |
|---|---|---|
| 2003/0111640 A1 | 6/2003 | Lub |
| 2004/0011995 A1* | 1/2004 | Faris .......................... 252/299.7 |
| 2004/0140451 A1* | 7/2004 | Meyer et al. ............. 252/299.01 |
| 2005/0067497 A1 | 3/2005 | Jones et al. |
| 2005/0072959 A1* | 4/2005 | Moia et al. ............... 252/299.01 |
| 2006/0177605 A1 | 8/2006 | Lub et al. |
| 2006/0188663 A1 | 8/2006 | Peglow et al. |
| 2008/0278675 A1 | 11/2008 | Escuti et al. |
| 2010/0059709 A1 | 3/2010 | Bachels et al. |

FOREIGN PATENT DOCUMENTS

| | | | |
|---|---|---|---|
| EP | 1 447 689 A2 | | 8/2004 |
| GB | 2430648 | * | 4/2007 |
| JP | 2001-234108 A | | 8/2001 |
| JP | 2003-253187 A | | 9/2003 |
| JP | 2004-122566 | * | 4/2004 |
| WO | 02/28985 A1 | | 4/2002 |
| WO | 2004/055720 A1 | | 7/2004 |
| WO | 2004/083913 A1 | | 9/2004 |
| WO | 2004/085547 A1 | | 10/2004 |
| WO | 2005/020289 A2 | | 3/2005 |
| WO | 2006/092758 A2 | | 9/2006 |
| WO | 2008/077261 A1 | | 7/2008 |

OTHER PUBLICATIONS

Franco Moia, et al., "Optical LPP/LCP Devices: A New Generation of Optical Security Elements", Proceedings of the SPIE-The International Society for Optical Engineering, SPIE, Jan. 27, 2000, pp. 196-203, vol. 3973.

* cited by examiner

OPTICAL BIOMETRIC SECURITY ELEMENT

This invention relates to optical elements for the purpose of identification and/or prevention of forgery or copying which contain at least one layer with anisotropic optical properties which comprises biometric information in the form of a pattern.

Biometric identification systems have grown in popularity as a way to provide personal identification. Personal identification is crucially important in many applications and the upsurge in credit-card fraud and identity theft in recent years indicates that this is an issue of major concern in wider society. Individual passwords, PIN identification, keyword personal questions or even token-based arrangements all have deficiencies that restrict their applicability in a widely-networked society. The advantage claimed by biometric systems is that they can establish an unbreakable one-to-one correspondence between an individual and a piece of data.

Mainly, the use of biometrics is the act of verifying an individual's identity by measuring or imaging unique characteristics of that individual and comparing the result with previous data of that characteristic. Typical phases of biometric security include the acquisition of the data (also called enrollment), the extraction (of a template based on the data), the comparison and the storage.

Fingerprint is the most widely used biometric, already in use for many civilian applications such as access control; time and attendance and computer user login. Fingerprint scanners are known as the "livescan" fingerprint scanners, whose basic principle is to sense the ridges and valleys on a finger when the finger is in contact with the surface of the scanner. The livescan image acquisition systems are based on four types of technology: frustrated total internal reflection (FTIR), CMOS capacitance, thermal, and ultrasound. Recently non-contact fingerprint scanners have been announced to avoid problems related touching a surface for scanning the fingerprint.

Biometric data comes in several different forms that can be readily acquired, digitized, transmitted, stored and compared in some biometric authentication device. The personal and extremely sensitive nature of biometric data implies that there are significant privacy and security risks associated with capture, storage and use. The drawback with biometric systems is the risk that can emerge when biometric data is not properly handled. Thus, there is a great need in the art for optical biometric security elements that can be easily recognized but can not be copied and/or falsified and have a high level of security. Biometric encryption is also a technique whereby the biometric data is used as a personal or private key to be used in some cryptographic processes, whereby optical encrypted biometric security elements are desired.

Optical security elements using Liquid Crystal Polymers (LCP) for polarisation conversion are known in the art, in particular, optical components containing a normally hidden image (second level inspection). Materials and methods for the preparation of such optical elements are described for example in U.S. Pat. No. 6,144,428 and U.S. Pat. No. 7,201,948. These components are based on a hybrid layer structure which consists of a photo-aligned orientation layer in contact with a layer of cross-linked liquid-crystal monomers or pre-polymers, wherein the orientation layer defines regions of alternating orientations. During the production of the liquid-crystal layer, the liquid-crystal monomers or pre-polymers are zonally oriented through interaction with the photo-alignment layer. This orientation, which is characterized by a spatial variation of the optical axis direction, is fixed by a subsequent cross-linking step, after which a patterned liquid crystal polymer layer with a pre-established orientation pattern is formed. Such layers have a transparent appearance. Under observation without additional aids, both the orientation pattern itself and the information written into the cross-linked LCP layer are invisible. If the substrate on which the layers are located is transparent and at least partially maintains the polarisation state of light, then the LCP orientation pattern becomes visible if the optical element is placed between two polarizers. If the birefringent LCP layer is located on a reflecting layer, then the pattern and the corresponding information can be made visible with a single polarizer which is held over the element.

A special type of photo-alignment material, based on photo initiated cross-linking and/or dimerization, is synonymously known as linearly polymerizable polymer (LPP) or photo-orientable polymer network (PPN). Examples of such photo-alignment materials and methods for the preparation of photo-alignment layers based on LPP-materials are for instance disclosed in U.S. Pat. No. 6,144,428.

Many types of technologies have been proposed for the storage of biometric data. Enhancements such as holograms, watermarks and embedded micro-threads are now commonly employed to establish the validity of ID cards.

The currently standardized biometrics used for this type of identification system are facial recognition, fingerprint recognition and iris recognition.

An immunization system using an optical immunization card which comprises a storage area for information which is accessible via an optical card reader is described in U.S. Pat. No. 7,128,258B1.

Smart cards, which offer the benefit of storing cryptographically secure information, have also proven to be effective in many authentication solutions, although the costs involved can be prohibitive for wide deployment. More recently, Microsoft® Biometric ID Technology provided a cryptographically secure ID card which is based on a new barcode technology that addresses biometric storage in a small space.

Also other techniques were described such as the development of DNA inks, which contain synthetic DNA mixed with printing inks (Journal of Experimental Medicine (2004), 204 (2), 109-117).

U.S. Pat. No. 7,009,190 describes a contact imaging method wherein the imaging sheet comprises a bistable thermally responsive material layer. For example, pressing a finger against a heated imaging sheet can form an image of a fingerprint in a cholesteric liquid crystal layer, wherein the contacted areas of the imaging sheet are in the planar state, and the non-contacted areas are in the focal-conic state. By applying an electric field the image can be erased again. The imaging sheet can be used to make temporary images of objects, such as fingerprints, handprints or footprints, which can later on be erased. Thus the element can not be used for long term storage of biometric information.

The task of the present application is to provide a permanent storage medium for biometrics whereby the biometrics data cannot be erased or modified using external stimuli, for use, for example, as security elements on identity cards, credit cards and badges for access control. It is particularly desirable that the stored information involves second level security, which means that an additional tool is required to recognize the complete set of security features. Such security elements can be used alone or in combination with other security elements to further increase the security level.

Accordingly, the present invention relates to an optical element for the purpose of identification and/or prevention of forgery and/or copying, comprising at least one layer with anisotropic optical properties, wherein the anisotropic optical properties are patterned, characterized in that the pattern represents biometric information. The optical elements according to the invention are preferably used as security elements. Specifically such security devices are applied to or incorporated into a security document like an identity card, passport, driver license, certificate, birth certificate, credit card, badge, ticket etc. against counterfeiting and falsification. Advantageously, the security device may take the form of a tag, security strip, label, fiber, thread, laminate or patch etc.

In the context of the present invention layer may be anything from thin coatings of a few nanometer thickness to films with a thickness of several hundred microns. The preferred range of thickness is 10 nm to 300 micron. More preferred is a thickness range from 50 nm to 10 micron and most preferred is a thickness range from 100 nm to 3 micron. Preferably, the pattern is an orientation pattern and/or a pattern of optical retardation.

Preferably the anisotropic properties are effective within a plane parallel to the layer.

The biometric information in the anisotropic layer should be permanent. Therefore, it is preferred that the material of the layer containing the pattern is chosen such, that the pattern is still present at room temperature after storing the optical element according to this invention for 10 hours at 80° C., more preferred at 100° C.

The unique (biometric) characteristic can be physiological, which include but is not limited to the shape of the body, fingerprints, hand geometry and iris texture of the eye, hand writings as for example signatures, hand veins, ear recognition, facial thermogram, DNA, odor and palm prints. In addition, the biometric characteristics can also be behavioral, such as for example the behavior of a person, dynamics of hand writing, keystroke dynamics, gait (way of walking) or voice.

Preferred types of biometric characteristics are fingerprints, iris texture, hand writings and voice.

Most preferred types of biometric characteristics are fingerprints, signatures and iris texture.

According to a preferred embodiment of the invention the biometric information in the optical element is encoded. Encoding is especially useful for behavioral biometric characteristics.

Biometric data of an individual person can for example be collected by electronic means, opto-electronic devices, cameras, direct contact or ink-based technologies.

Provided that polarizers are adequately applied for observation of each of the different embodiments of the invention, the optical appearance of the biometric information stored in the optical elements according to the invention depends on the polarisation state of the light. In particular the observed optical contrast of the pattern representing the biometric information depends on the direction of the polarized light applied for observation.

Optical elements according to the invention can either be used in transmission or in reflection. The optical properties may have to be adapted to the transmissive or reflective mode to achieve optimum optical performance in either mode. When used as a reflective element a reflector is behind the optical element, as viewed from the observer. Any kind of reflector may be used; it may be diffusive or non-diffusive. The reflector may be the substrate itself or any coating that may act as reflector. Optical elements of the invention may be observed visually or by optoelectronic detection systems, such as for examples cameras or other optical detectors.

In a preferred embodiment of the invention at least one layer with anisotropic optical properties comprises at least one area wherein the refractive index is anisotropic. A material or layer with anisotropic refractive indices is also known as a birefringent material or layer, respectively. Since only the polarisation state of the light is affected by birefringent materials, the biometric information stored in such an optical element can only be seen when polarized light is applied for observation and the light which has passed the optical element is analyzed according to its state of polarization. When employed as a transmissive element, visual observation of the biometric information contained in such an optical element is usually performed by putting the optical element between two polarizing sheets. When a reflector is behind such an optical element, visual observation can be done by looking at the element through a single polarizer arranged between the optical element and the observer. The reflector should at least partially maintain the polarisation state of that light upon reflection at the reflector. Similar arrangements of polarizers can be used for optoelectronic detection systems.

In the context of the present invention aligning surface shall mean any surface of a substrate that has aligning capabilities for liquid crystals. The substrate may comprise coatings which generate or transfer such aligning capabilities. Such coatings are well known as alignment layers in liquid crystal displays.

Alignment layers can be prepared using any technique known in the art, which include but is not limited to rubbing, oblique deposition of SiO or the like, photolithographic grating, LB films, ion irradiation process, laser writing of surface structures, alignment texture transfer by stamping, photo-alignment including photo-dimerization, photo-decomposition, photo-isomeriation.

Preferably, the alignment layers are made by photo-alignment, more preferably based on linearly photo-polymerized (LPP) alignment layers.

In the context of the present invention the terms "alignment" and "orientation" of liquid crystals are used synonymously. The same is true for the terms "align" and "orient" when related to liquid crystals.

In the context of the present invention orientation pattern means a pattern within the aligning surface of a substrate and/or in an LCP layer, such that the orientation directions in at least two areas are different from each other. In particular, the orientation pattern may comprise a continuous variation of orientation directions. In case of an aligning surface the term orientation direction refers to the direction in which a liquid crystal in contact with the aligning surface will be aligned. In case of an LCP layer the term orientation direction refers to the local preferred direction of the liquid crystal molecules. The term orientation direction covers both the azimuthal as well as the polar direction. For the latter, also the term tilt angle is used, which defines the polar angle between the orientation of the long liquid crystal molecule axis and the surface.

In the context of the present invention a pattern of optical retardation means a pattern in a birefringent material such that the optical retardations in at least two areas are different from each other. Different optical retardations may be caused for example by different thicknesses and/or different birefringence. Different birefringence values can for example be achieved by local modification of the molecular polarizability or by locally depositing different materials with appropriate optical properties. In case of a liquid crystal polymer it is also possible to locally modify the order parameter.

A preferred embodiment of the invention relates to an optical element for the purpose of identification and/or prevention of forgery or copying, comprising at least one layer with anisotropic optical properties, which comprises a liquid crystal polymer, wherein the anisotropic optical properties are patterned, characterized in that the pattern represents biometric information. The liquid crystal polymer is preferably a liquid crystal (co)polymer, liquid crystal elastomer, liquid crystal polymer gel or liquid crystal polymer network. More preferably the liquid crystal polymer is a liquid crystal polymer network. The liquid crystal polymer material may also comprise a photo-alignment material.

In a preferred embodiment, an aligning surface is beneath at least one layer comprising a liquid crystal polymer. Preferably, the aligning surface exhibits an orientation pattern.

In another preferred embodiment, the pattern is a pattern of optical retardation. This can, for example, be realized by a pattern, which exhibits areas of different thickness. Alternatively, this can be realized by a layer of liquid crystal polymers with locally different liquid crystal order parameters.

In another preferred embodiment of the invention the anisotropic properties refer to absorption. Anisotropic absorption can for example be realized by liquid crystal polymer materials comprising aligned dichroic dyes. The biometric information contained in such types of optical elements may be seen without additional polarizers, depending on the type of pattern representing the biometric information and on the viewing angle. Typical observation will be done either by illumination of the optical element with linearly polarized light or looking through a polarizing sheet. Reflectors applied to such optical elements do not require maintaining the polarisation state of light. Therefore materials such as for example paper, plastics, diffusive coatings, pigments and colors can act as a reflector.

In another preferred embodiment of the invention at least one patterned layer comprises liquid crystal polymer and an aligned fluorescent dye embedded in the liquid crystal polymer, which absorb and/or emit light anisotropically. The biometric information in such optical elements can be observed by illumination with polarized light of wavelengths overlapping with the absorption band of the fluorescent dye and/or by analysing the polarisation state of the light emitted by the fluorescent dyes, for example with a polarizing sheet.

The present invention also relates to methods for the preparation of optical elements according to the invention. The collected biometrical data may be transferred into the layer with anisotropic optical properties either using a direct or an indirect method.

Direct method shall mean that the biometric information is directly applied to the layer with anisotropic refractive indices and/or anisotropic absorption without the need of any other material or film.

The indirect method uses polymerizable or polymerized liquid crystals for preparation of the layer with anisotropic refractive indices and/or anisotropic absorption. Indirect method means that the biometric information is initially transferred into an aligning surface. In a subsequent step, the biometrics data are transferred to polymerizable or polymerized liquid crystals coated on top of the aligning surface.

According to a preferred embodiment of the invention, the aligning surface is prepared by local deposition of an aligning layer material to a substrate. Any type of alignment technique as described above can be used, as long as it can be deposited locally. For selective deposition of alignment materials standard printing techniques can be used which include but are not limited to: silk screen printing, relief printing such as flexographic printing, ink jet printing, intaglio printing such as direct gravure printing or offset gravure printing, lithographic printing such as offset printing, or stencil printing such as screen printing. The most preferred printing technique for local deposition is ink jet printing. Depending on the type of alignment, further processing, such as rubbing or exposure to aligning light, may be required to define the orientation direction in the deposited material. The pattern generated on the substrate by the deposited aligning material may already represent the biometric data. It is also possible to create an additional orientation pattern within the pattern defined by the deposited aligning layer material, which represents part or all of the biometric data.

The term aligning light shall mean light of wavelengths, which can induce anisotropy in a photoalignment layer. Wavelengths, intensity and energy of the aligning light are chosen depending on the photosensitivity of the material and on the required orientation performance. Preferably, the wavelengths are in the UV-A, UVB and/or UV/C-range or in the visible range.

The aligning light should at least be partially linearly polarized or elliptically polarized, when exposed in the normal direction to the alignment layer. If the light is exposed obliquely it may have any polarisation state, for example non-polarized, circularly polarized, elliptically polarized, linearly polarized or a superposition of polarisation states. Preferably the aligning light is at least partially linearly polarized.

Preferred indirect methods for the transfer of biometric data are those, which modify the initial aligning properties of an aligning surface, such as the azimuthal or polar orientation directions.

A pattern representing biometric information can also be transferred into an aligning surface by locally ablating, bleaching or otherwise destroying initial aligning capability of the aligning surface. This can for example be done by area selective bombardment with particles and/or electromagnetic radiation. The particle radiation may consist of ions, atoms, molecules and/or electrons; the electromagnetic radiation may be IR-, visible-, UV-light or x-rays.

In a preferred method, a fingerprint is directly put on top of a substrate with an aligning surface. The transferred fingerprint may comprise fat of the skin or other materials deposited on the finger prior to transferring the fingerprint. It is important to choose the material deposited on the finger such that it is not dissolvable in the solvent of the polymerizable or polymerized liquid crystal solution, which is coated on top of the fingerprint in a subsequent step. The liquid crystal material will not be perfectly aligned in those areas of the fingerprint texture, in which the aligning surface was covered by the material transferred from the finger. However, except of those areas, the liquid crystal material will be aligned. In the finished element, the fingerprint texture will appear when observed with polarized light because of the poor liquid crystal orientation quality in the areas corresponding to those areas to which the material of the fingerprint was transferred.

Most preferred indirect methods for the transfer of biometric data are those, which use photo-alignment techniques for the modification of the aligning properties.

According to one aspect of the invention there is provided a method for the preparation of an optical element containing biometric information, comprising the steps of preparing a layer of a photo-alignment material on a substrate transferring the biometric information into the alignment layer by exposure to aligning light in the form of an orientation pattern coating polymerizable liquid crystals on top of the alignment layer, start polymerization of the liquid crystals by thermal or photo-initiation after the liquid crystals are aligned.

According to another aspect of the invention there is provided a method for the preparation of an optical element comprising biometric information, comprising the steps of preparing a layer of a photo-alignment material on a substrate transferring the biometric information to the alignment layer by exposure to aligning light in the form of an orientation pattern coating polymerized liquid crystal material on top of the alignment layer.

Most preferred materials for the photo-alignment layer are those of the linearly photo-polymerizable (LPP) type.

Any method to generate an orientation pattern in the photo-alignment layer can be used. Preferred methods are multiple exposures with aligning light of different polarisation directions through one or more photo-masks, laser scanning, exposure with actinic light through an alignment master, which generates the spatial variation of the polarisation corresponding to the desired orientation pattern, as disclosed in U.S. Pat. No. 6,496,239, and projection of a spatial pattern of aligning light involving for example a digital mirror device (DMD).

The alignment layer material as well as the polymerizable and the polymerized liquid crystal material can be applied by general coating and printing methods known in the art, which include, but are not limited to: spin-coating, blade coating, knife coating, kiss roll coating, cast coating, slot-orifice coating, calendar coating, electrodepositing coating, die coating, dipping, brushing, casting with a bar, roller-coating, flow-coating, injection-molding, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating, silk screen printer, relief printing such as flexographic printing, ink jet printing, intaglio printing such as direct gravure printing or offset gravure printing, lithographic printing such as offset printing, or stencil printing such as screen printing, or any other method.

The present invention further provides methods to transfer biometric data directly into the layer with anisotropic properties. Some of these methods apply local treatment to modify or remove the anisotropic properties of the anisotropic layer according to the pattern representing biometric information.

In a first embodiment for direct transfer of biometric data, the layer with anisotropic properties is locally bleached. In the context of the present invention bleaching shall mean any process that causes a modification of chemical properties of the anisotropic layer, such that the anisotropic optical properties are changed during the bleaching process. Bleaching can for example be achieved by external stimuli such as particle and/or electromagnetic radiation. The particle radiation may consist of ions, atoms, molecules and/or electrons, the electromagnetic radiation may consist of IR-, visible-, UV-light or x-rays. According to the present invention bleaching with UV-light is the most preferred method. Selective local bleaching is achieved by means of a single or multi-step exposure of the optical anisotropic layer through one or more photo- or dotmasks and/or by applying a scanned beam of radiation to the optical anisotropic layer.

In another preferred method according to the present invention, the anisotropic properties are locally modified by ablation in order to directly transfer biometric data to the anisotropic layer. In this method material is locally removed from the surface of the anisotropic layer by absorption of energy and localized heating of the surface, and subsequent material evaporation. This can be done for example by laser ablation. Laser ablation is greatly affected by the nature of the material and its ability to absorb energy, therefore the wavelength of the ablation laser should be selected to best match the absorption bands of the material to be ablated. The preferred types of lasers for that purpose are excimer lasers. Alternatively, ablation can be achieved by particle bombardment, for example with ions, atoms, molecules and/or electrons.

A further preferred method for the preparation of optical elements according to the invention relates to the direct transfer of biometric information into layers, comprising polymerizable or polymerized liquid crystals coated or printed on top of an aligning surface, by generating locally different polymerization degrees in the liquid crystal layer according to the pattern to be transferred.

This can, for example, be done by selective local curing of the polymerizable liquid crystals in a pattern corresponding to the biometric information. This can be done, for example, by exposure to actinic light with spatially varying intensity generated by a black and white or grayscale photo-mask between the light source and the liquid crystal layer. Any other technique to locally apply different radiation energy can be used as well, such as exposure with a scanning beam of actinic light or projection of a spatial pattern of actinic light involving for example a digital mirror device (DMD).

The pattern thus generated comprises areas with different polymerization or crosslinking degrees. The local degree of polymerization is quantifiable by a measurement of the local ratio of the unreacted polymerizable groups in the liquid crystal composition after the polymerization. If high resolution of the patterning is envisaged, it is of advantage to use collimated radiation. The area-selective polymerization is achieved by radiation induced polymerization, preferably radical or cationic polymerization, more preferably radical polymerization.

Non limiting examples of liquid crystal materials that can be patterned by local curing are:

Compositions containing liquid crystal monomer capable of undergoing a radical polymerization whereby the resolution required for the use of the biometrics depends on the type of biometrics. Preferably, the propagation of the radical polymerization is controlled using for example living radical polymerizations such as for example photo-iniferter mediated polymerization.

Most preferred are compositions undergoing polythiol polymerization or compositions containing compounds having antioxidant groups in particular thioether groups as for example Irgacure® 907, as described in WO08077261 compositions containing liquid crystal monomer capable of undergoing a cationic polymerization as disclosed in WO02/28985 compositions containing liquid crystal monomer capable of undergoing hybrid cationic and radical polymerization.

There are different methods to proceed in order to create a detectable optical difference between the polymerized and the non-polymerized areas.

In a first of these methods, in which only two different polymerization degrees are generated, whereas one of them is non-polymerized, the non-polymerized areas are rinsed with a selective solvent which dissolves the non-polymerized molecules but does not affect the polymerized part. This method follows very much the well known lithographic procedures used for example in electronic industries. The resulting pattern, which represents the biometric data, consists of areas with and areas without liquid crystal thus the maximum difference of optical anisotropy between the two areas is achieved.

In a second of these methods the liquid crystal layer is heated to an elevated temperature to change the order parameter in those areas of the liquid crystal material which were not polymerized. In particular, this temperature can be above the clearing temperature of the non-polymerized liquid crystal material to convert the liquid crystal into the isotropic phase. Polymerisation of the remaining non-polymerized liquid crystals is then performed at the elevated temperature either by thermal and/or photo-initiation which freezes in the order parameter corresponding to this temperature. In this way a pattern of retardation with two or more different retardation values can be realized.

According to another method of the invention to change the orientation of the polymerizable liquid crystal material prior to polymerisation is to use liquid crystal compositions containing one or more isomerizable components (WO2004/083913A1) and induce a local modification of the order parameter and hence of the optical retardation by exposure to light with a spatial intensity variation according to a pattern representing the biometrical information. The wavelength of the light has to be selected according to the wavelength sensitivity of the isomerizable components.

According to a preferred embodiment of the invention, polymerizable or polymerized liquid crystals are printed or written to a substrate directly in the form of a pattern desired to represent the biometric information. Preferably the substrate exhibits an aligning surface.

Printing of polymerizable or polymerized liquid crystals can be performed with any printing technique known in the art, which include but are not limited to: silk screen printing, relief printing such as flexographic printing, ink jet printing, intaglio printing such as direct gravure printing or offset gravure printing, lithographic printing such as offset printing, or stencil printing such as screen printing. A preferred printing technique for local deposition is ink jet printing.

According to a preferred method of the invention the biometric information is transferred into an optical element, as depicted in FIG. 5, by handwriting 1 with an ink 2, which comprises polymerizable or polymerized liquid crystals. The term liquid crystal ink is used in the following for this special type of ink. The biometric information in this case is the characteristic handwriting itself, for example a signature. Handwriting the liquid crystal ink can for example be done with a pen 3 or stylus or any other tool which can be used for writing with an ink. The composition of the liquid crystal ink has to be optimized for the special pen or stylus, in particular to control the compatibility with the substrate, surface energy, viscosity as well as the thickness of the layer generated by writing. The substrate 4 to which handwriting is performed may have an aligning surface 5, but it is also possible to write on a surface without alignment capability. Substrate 4 in FIG. 5 has an aligning surface with an aligning direction as indicated by the arrow 6.

If no dyes are included in the liquid crystal ink, the handwriting can not be seen in non-polarized light, but can be observed in polarized light. If in case of a transmissive substrate the substrate with the handwriting is properly arranged between crossed polarizers the handwriting appears bright on a dark background. If designed for reflective mode and a reflector 7 on substrate 4, is behind the optical element 8 comprising the handwriting, then the handwriting appears dark on bright, when observed with a single polarizer 9 (FIG. 6).

In case the substrate has an aligning surface exhibiting a uniform aligning direction, then the liquid crystals deposited by handwriting will align uniformly along the orientation direction of the aligning surface. When such element is observed in polarized light (two polarizers in case of a transmissive substrate, one polarizer for a reflective substrate) then the contrast of the handwriting depends on the angle between polarizer(s) and orientation direction. If the polarizer(s) is (are) arranged 45° to the orientation direction then the handwriting appears with maximum contrast, whereas the handwriting is not visible if the polarizer(s) is (are) arranged parallel or perpendicular to the aligning direction.

According to a preferred embodiment, the surface exhibits no or only weak alignment capability. Thus it is possible to align the liquid crystal ink by the shearing force, which is present during writing. In this way the characteristic dynamics in writing of a person influences the alignment of the liquid crystal ink. Preferably, the ink is in a liquid crystal phase before or immediately after handwriting is performed. As a result, another biometric feature, the dynamics of writing, is included, which can be analysed in the final element using a polarizer, which is rotated to recognize the local alignment of the liquid crystal material.

According to another preferred embodiment, the security level of an optical element according to the present invention is strongly increased by printing or handwriting liquid crystal materials to a substrate with an aligning surface that comprises an orientation pattern, and the liquid crystal will then be aligned according to the local orientation of the aligning surface. Any alignment method which is able to generate an orientation pattern can be used, which includes but is not limited to photo-alignment, imprinting an alignment structure, gratings, multiple rubbing, rotating rubbing, moving the substrate or the brush other than uniaxial during rubbing, laser ablation. The pattern representing the biometrical information will then be overlapped with the characteristic pattern of the aligning surface. Any design can be used for the orientation pattern, such as line or checkerboard patterns, graphics, text, microtext, images etc. The orientation pattern of the aligning surface may be designed such that it appears like a watermark inside the biometric pattern. Preferably such a pattern consists of microtext 17, a logo or graphics on substrate 14 (FIG. 8). The structure size of an orientation pattern can be designed to optimally fit with the pattern representing the biometric information.

Especially handwriting with a liquid crystal ink on an aligning surface exhibiting an orientation pattern as described above yields in very impressive optical elements with very high security level, since it combines different security features.

In a simple example, the liquid crystal layer in the form of a signature is handwritten on top of an orientation pattern 26 that has the form of a line pattern. When observing the signature in polarized light by applying the polarizers properly, the lines of the signature appear interrupted. In another example, the orientation pattern exhibits a continuous alignment variation. When the final element is observed with one or two polarizers, depending on the specific embodiment, the signature appears with a contrast gradient. By rotating the polarizer(s) the contrast gradient changes, which generates a dynamic effect during observation.

According to another preferred method of the present invention, the liquid crystal ink 32 comprises dichroic dyes 33 in addition to the polymerizable or polymerized liquid crystals 31 (FIG. 9). Handwriting with the dye containing an ink can then be seen directly after writing. If observed with a polarizer on top then the intensity of the colored signature changes depending on the angle of the polarization axis of the polarizer relative to the orientation direction in the optical element. In another method of the present invention, the liquid crystal ink 34 comprises fluorescent dyes 35 in addition to the polymerizable or polymerized liquid crystals 31 (FIG. 10).

In a preferred method, handwriting with the dye containing liquid crystal ink is performed on a substrate with a pattern of different tilt angles. In FIG. 7 the different tilt angles are indicated by the length of the arrows 41, 42, in the corresponding area of the pattern. Even more preferred is a pattern of opposite tilt angles. The tilt pattern can then be seen without a polarizer by tilting the optical element. When tilting the optical element in the opposite direction, the contrast of the pattern inverts.

In another preferred embodiment the orientation pattern consists of areas with orientation directions orthogonal to each other. The pattern can then be observed by observation with a polarizer or in polarized lighting conditions or by tilting the substrate with the handwriting around an axis parallel to one of the orientation directions.

According to another method of the invention the biometric information is stamped or pressed into the layer of polymerizable or partially polymerized liquid crystals. This is possible for any part of a human body that exhibits a surface profile, in particular the fingers. Preferably, the liquid crystal material is not fully polymerized. During pressing or stamping, the material has to be viscous enough to be able to slightly flow around the texture imprinted from the top of the surface. As a consequence, the retardation and/or the orientation changes in areas which were pressed.

In several of the above methods, photomasks containing the biometric information are used to generate the spatial light distribution required to expose either photo-alignment layers or polymerizable liquid crystals. Photomasks are well known from photolithography where typically lithographic photomasks are transparent fused silica blanks covered with a pattern defined with a chromium metal absorbing film. The production of such photo-masks is very expensive and time consuming. The use of such photomasks for the transfer of individual biometric data into optical elements according to the present invention is therefore not practical. Photomasks to be used for the processes of the present invention must therefore be cheap and easy to prepare, since in most cases they are produced just for a single use.

Therefore, there are also provided methods to prepare photomasks comprising patterns of the collected biometric data for the transfer to the optical element according to the invention.

A first method involving the production of photomasks and the transfer of biometric data comprises the steps of
  collecting the biometric data and transfer the data into a digital electronic format
  optionally store the data in a digital storage device and print the pattern representing the biometric data to a transparent substrate
  use the substrate with the printed pattern representing the biometric data as a photo-mask to transfer the biometric data into the optical element according to the present invention.

Any printing technique known in the art can be used for printing the biometric data. Preferred are printing methods which can be directly accessed from an electronic device, such as those for example used in modern newspaper printing. Also any kind of printers known as computer printers, for example laser printers, ink-jet printers, thermo transfer printers and the like can be used for that purpose.

Any opto-electronic devices and digitizing systems like scanners, video cameras, digital cameras and the like can be used for collecting optically detectable biometric data and for transferring them into a digitized electronic format. If the biometric data is a fingerprint, a fingerprint scanner can be used for that purpose.

If the biometric data relates to handwriting, electronic acquisition can for example be done directly by using an electronic pen or an electronic board as disclosed in WO2005020289.

In a second method to produce photomasks for the transfer of biometric data, a transparent substrate is directly inked with the biometric data to be transferred. Accordingly, a method is provided, in which a photo-mask is generated by directly recording the biometric information on a transparent substrate such as glass or plastic.

This can be done for example by writing a signature or putting a fingerprint to the substrate using an opaque ink. The signature can be written with any pen, pencil, marker and the like, which deposits ink or any other material, which fits with the requirements for a photo-mask.

A fingerprint can be acquired by pressing a finger onto a viscous inked surface, and pressing the inked finger against a transparent substrate. Preferably an ink that is designed specifically for fingerprinting purposes is used (for example from I.D. Technologies, USA). The substrate with the fingerprint can directly be used as a photomask.

Transparent substrate means that it has to be at least partly transparent for the actinic light used to initiate the desired photo-reactions in the processes which involve the photomask. Preferably, the photo-mask is at least partly transparent in the UVA and/or UVB spectral ranges. Advantageously, the substrate exhibits a low or no birefringence.

Any type of materials can be used as transparent substrate as long as it fulfills above requirements. Preferred types of substrates are glass, fused silica and plastics.

To further enhance the security of the overall system, the biometric data can be encrypted using a special algorithm. When authentication is desired, the user uses the biometric live measurement that is also converted into an encrypted value. Thereafter, the encrypted reference value is compared to the encrypted data value to determine if the values substantially match. The encryption technique is in particular useful for biometrics such as voice, keystroke dynamics, response to personal questions, hand veins, ear recognition, facial thermogram, DNA, odor, palm prints and the like.

The optical elements according to the present invention may be used alone or in combination with other security elements. Especially optical elements according to the invention which are transparent can be arranged above other security elements, printings, photos etc., since they do not disturb the design and the visibility of the underlying elements and are visible on demand by applying the appropriate means, for example one or two polarizers, for detection.

Optical elements according to the present invention may comprise one or more types of biometric data. It is also possible to combine different embodiments of the invention in a single element.

The invention will now be described by way of example with reference to the accompanying drawings, in which.

Figure 2A:
FIG. 2 shows an optical element according to the invention as observed between crossed polarizers, comprising a fingerprint pattern in a liquid crystal layer by a method of indirect transfer of the fingerprint pattern, which was first transferred into a photo-alignment layer. The photo-mask of FIG. 1*a* was used for LPP exposure.

FIG. 2*a* shows a photo of the positive image.

Figure 2B:

FIG. 2*b* shows a photo of the negative image which appears when the optical element is rotated by 45° compared to the arrangement in FIG. 2*a*.

Figure 3:
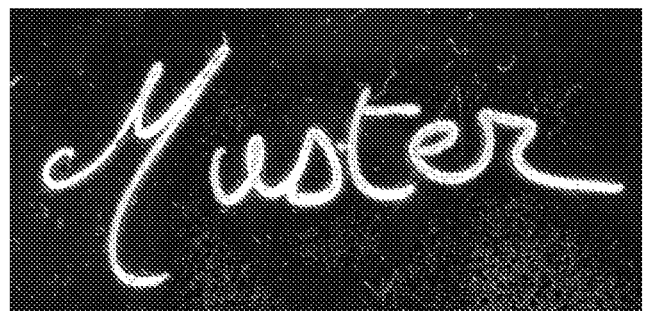

FIG. 3 shows a photo of an optical element according to the invention comprising a birefringent signature between crossed polarizers. The signature was handwritten with a liquid crystal material to a substrate comprising an alignment layer.

Figure 4:
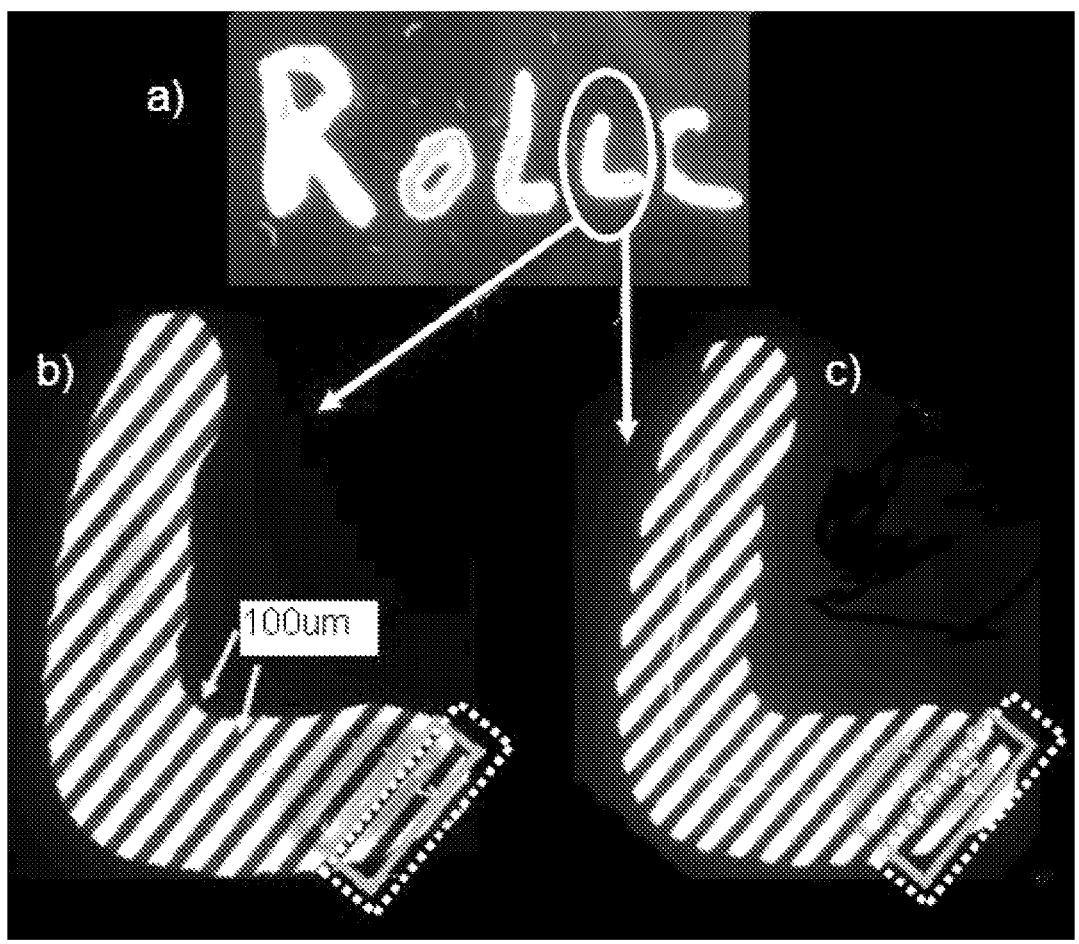

FIG. 4 shows a photo of an optical element according to the invention comprising a birefringent, patterned signature between crossed polarizers. The signature was written with a liquid crystal material to a substrate comprising an alignment layer exhibiting an orientation pattern.

FIG. 4*a* direct photo;

FIG. 4*b* as observed in a polarizing microscope FIG. 4*c* as observed in a polarizing microscope, but polarizer and analyzer rotated by 45° compared to FIG. 4*b*.

Figure 5:
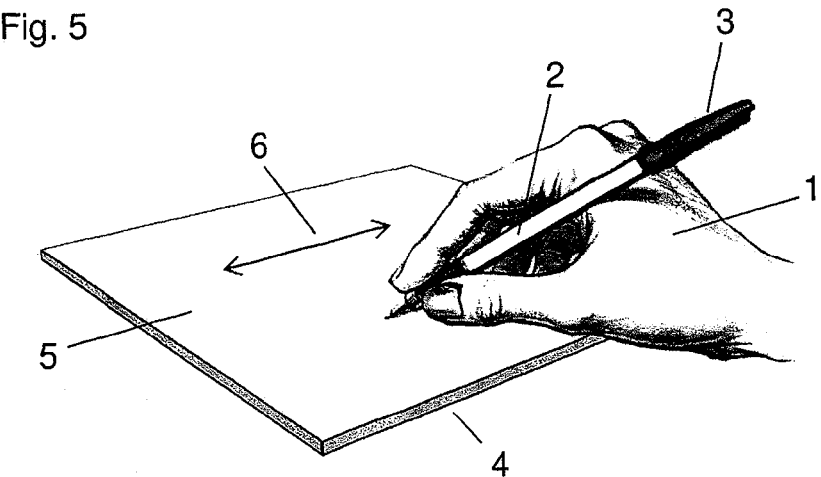

FIG. 5 depicts the method of handwriting with a pen a liquid crystal ink to a substrate having an aligning surface.

Figure 6:
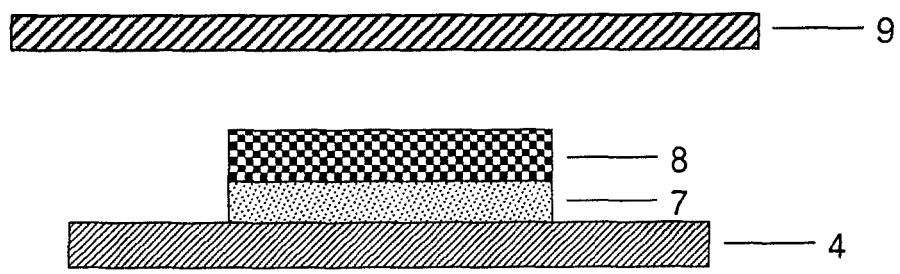

FIG. 6 shows a device with a reflector behind the optical element comprising the handwriting.

Figure 7:
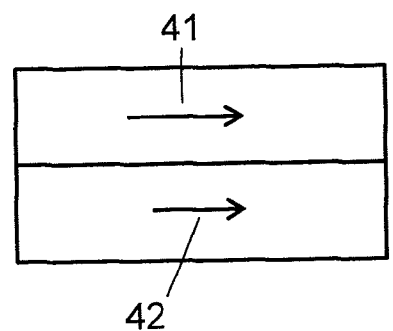

FIG. 7 shows a substrate with an aligning surface comprising a pattern of different tilt angles.

Figure 8:
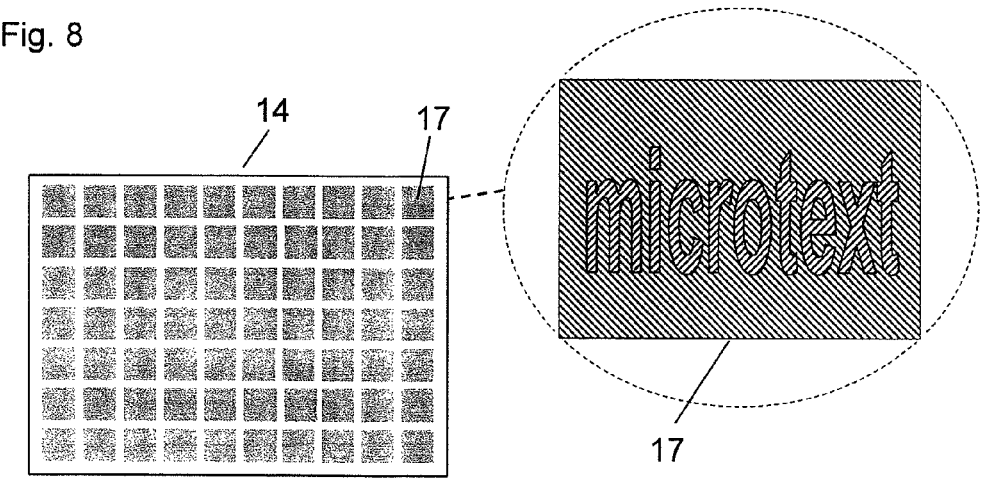

FIG. 8 shows a substrate with an aligning surface comprising an orientation pattern representing microtext.

Figure 9:
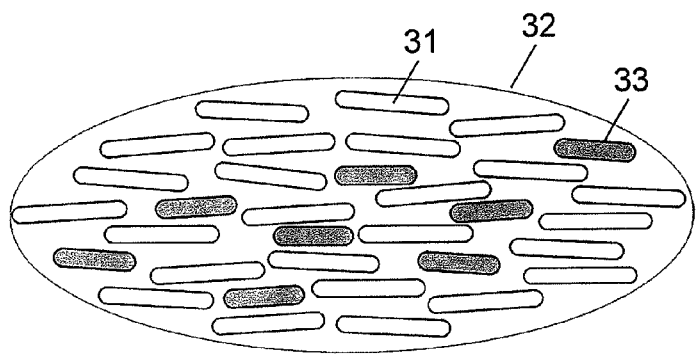

FIG. 9 depicts a liquid crystal ink comprising dichroic dyes.

Figure 10:
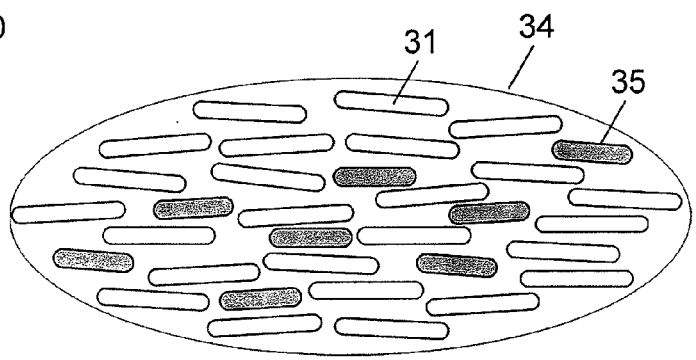

FIG. 10 depicts a liquid crystal ink comprising fluorescent dyes.

EXAMPLES

Photo-alignment material LPP1 used in the following examples has the following chemical structure:

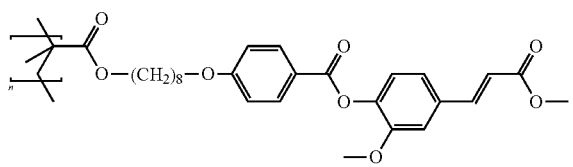

Example 1

Composition of the Polymerizable Liquid Crystal Material M1 Designed for Generation of Patterns of Optical Retardation

| Compound | Weight (%) |
|---|---|
| 2,5-bis-[4-6-acryloyloxyhexyloxy)benzoyloxy]benzoic acid pentyl ester prepared in analogy to Schemes 1, 2, 3, 4 of US5,593,617 | 91.4 |

-continued

| Compound | Weight (%) |
|---|---|
| Pentaerythritol tetrakis(3-mercaptopropionate) | 5.0 |
| Irgacure ® 369, photoinitiator, 2-benzyl-2-dimethylamino-1(4-morpholinophenyl)-butanone-1 from CIBA Specialty Chemicals Inc. | 3.0 |
| Tinuvin ® 123, bis(1-octyloxy-2,2,6-tetramethyl-4-piperidyl) sebacate from CIBA Specialty Chemicals Inc. | 0.5 |
| Hydrochinon-monomethylether, from Aldrich | 0.1 |

The clearing temperature of this composition is $T_c \approx 44°$ C.

Example 2

Composition of the Polymerizable Liquid Crystal Material M2

| Compound | Weight (%) |
|---|---|
| 2,5-bis-[4-6-acryloyloxyhexyloxy)benzoyloxy]benzoic acid pentyl Ester, prepared in analogy to Schemes 1, 2, 3, 4 of U.S. Pat. No. 5,593,617 | 97.0 |
| Irgacure ® 369, photoinitiator, 2-benzyl-2-dimethyl-amino-1(4-morpholinophenyl)-butanone-1 from CIBA Specialty Chemicals Inc. | 1.0 |
| Tinuvin ® 123, bis(1-octyloxy-2,2,6-tetramethyl-4-piperidyl) sebacate from CIBA Specialty Chemicals Inc. | 1.0 |
| Butyl-hydroxy-toluol, from Aldrich | 1.0 |

The clearing temperature of this composition is $T_c \approx 55°$ C.

Example 3

Composition of the Polymerizable Liquid Crystal Material M3 Containing Dichroic Dyes

| Compound | Weight (%) |
|---|---|
| 2,5-bis-[4-6-acryloyloxyhexyloxy)benzoyloxy]benzoic acid pentyl Ester, prepared in analogy to Schemes 1, 2, 3, 4 of U.S. Pat. No. 5,593,617 | 88.0 |
| Dichroic dye, prepared in analogy to WO2004/085547 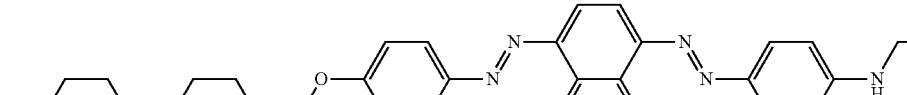 $\lambda_{max}$ = 550 nm  $\epsilon$ = 34000 | 10.0 |
| Irgacure ® 369, photoinitiator, 2-benzyl-2-dimethylamino-1(4-morpholinophenyl)-butanone-1 from CIBA Specialty Chemicals Inc. | 1.0 |
| Butyl-hydroxy-toluol, from Aldrich | 1.0 |

Example 4

Preparation of a Fingerprint Optical Element Using Photo-Patternable LCP Materials and a Development Process A photomask was prepared by direct contact printing a fingerprint to a plate of fused silica. For this purpose the right index finger was inked using a fingerprint pad from I.D. Technologies. The finger was pressed to the pad and rolled from right to left during pressing. After the finger was inked it was pressed to the fused silica substrate and rolled from the right side to the left side during pressing. This process has transferred the fingerprint to the fused silica plate, which was now ready to be used as a photomask for generating an optical element according to the present invention.

Then a solution of the photo-alignment material LPP1 with a solid content of 2 weight percent in cyclopentanone was spin-coated at 2000 rpm for 60 s to a D263 glass plate to form a photo-alignment layer with a dry thickness of approximately 60 nm. The alignment layer was subsequently thermally treated on a hot-plate for 10 minutes at a temperature of 180° C. After that, the photo-alignment layer was exposed to linearly polarized UV light (LP-UV) (wavelengths between 280 and 320 nm) from normal direction. A dose of 150 mJ/cm² was applied at an intensity of 3 mW/cm². This process is known to induce alignment for liquid crystals in the LPP1 layer, which is parallel to the polarisation direction of the LP-UV light. In a next step, a 25 weight percent solution in cyclopentanone of the formulation M1 (Example 1) was spin-coated on top of the functionalized photo-alignment layer at 800 rpm during 60 s. A dry film thickness of approximately 800 nm was achieved this way. A thermal treatment at a temperature of 40° C. on a hot-plate was then carried out for 10 minutes. After that, a patterned UV-radiation using the mask of the fingerprint was done. For this, the film was exposed to collimated light through the black and white mask carrying the fingerprint pattern. The mask was kept at a distance of approximately 15 micron from the surface of the liquid crystalline layer using plastic spacers. Local polymerization of the liquid crystal layer was photo-initiated by illuminating it through the mask with UV-A light of a dose of 500 mJ/cm² under air atmosphere. After that, a development process was conducted by dipping the substrate with the prepared layers in ethyl-acetate for 10 seconds to remove the unpolymerized material.

Figure 1A:
FIG. 1a shows the photo of a photo-mask of a fingerprint, generated by a direct contact method.
Figure 1B:
FIG. 1b shows a photo of an optical element according to the invention comprising a fingerprint pattern by a method of direct transfer of the fingerprint pattern into the liquid crystal layer, as observed between crossed polarizers.

The optical element which resulted was transparent and the fingerprint could not be seen. After arranging the optical element between crossed polarizers with the orientation direction of the LPP layer at 45° to the polarisation axis of the polarizers, the fingerprint texture could be seen with high contrast, as is demonstrated by the photo in FIG. 1b.

Example 5

Preparation of a Fingerprint Optical Element Using Photo-Patternable LCP Materials and a Curing Process at Higher Temperature The same process for the preparation of the LPP layer and the liquid crystal layer including the exposure steps was used as in example 4 except that instead of carrying out a development process a second polymerization of the unexposed LCP zones was applied at a temperature above the clearing temperature of mixture M1. After the first UV exposure of the LCP layer, the sample was heated to 60° C. by means of a hot-plate, and a second radiation with non-collimated light of 500 mJ/cm2 (UVA and UVB) at 50 mW/cm2 was carried out without a mask in air atmosphere at 60° C.

After completing the above process observation of the optical element between crossed polarizers showed that the LCP areas that were crosslinked during the first curing process were birefringent whereas the areas crosslinked during the second process were isotropic. The optical appearance of the optical element was the same as that of example 4.

Example 6

Preparation of a Fingerprint Optical Element Using Retardation Patterning Obtained with Two LCP Layers A photo-aligned layer was prepared on a substrate as described in example 4. On top of the LPP layer a polymerizable liquid crystalline composition M1 was coated and homogeneously UV-irradiated without a mask to polymerize the layer.

Then a second layer of the polymerizable liquid crystalline formulation M1 was spin-coated on top of the first polymerized liquid crystalline layer with the spin parameters of 800 rpm during 60 s. For this, a 25 weight percent solution in cyclopentanone was used. A dry film thickness of approximately 800 nm was achieved this way. A thermal treatment at a temperature of 40° C. on a hot-plate was then carried out for duration of 10 minutes. After that, a patterned radiation curing of the LCP-layer with collimated light through a photo-mask exhibiting a fingerprint pattern was done. The UV dose was 1000 mJ/cm$^2$ (UVA and UVB) at 8 mW/cm$^2$. The mask was kept at a distance of approximately 15 micron from the surface of the liquid crystalline layer.

Then the film was processed as described in example 5, whereby the unexposed zones were polymerized above the clearing temperature of composition M1.

In this case, no additional photo-alignment layer was used in between the two liquid crystal polymer films. Thus, the second, patterned liquid crystal polymer film is aligned parallel to the first one.

The resulting optical element was transparent and no image could be observed in non-polarized light. When the element was arranged between crossed polarizers the fingerprint texture could be seen consisting of two different gray levels. The two gray levels were caused by areas with higher retardation corresponding to the sum of the retardations of the two liquid crystal polymer films and areas with lower retardation corresponding to the retardation of only the lower, un-patterned liquid crystal polymer film.

The same optical performance could have been achieved when a birefringent film were used instead of the first LCP film. In this case the birefringent film could have been used as the substrate as well.

Example 7

Preparation of a Fingerprint Optical Element Using Retardation Patterning with Two LCP Layers Whereby the Alignment of the Second LCP Layer is Perpendicular to the First Layer A first LPP layer and a first LCP layer were prepared on a substrate like in example 6. Then, by means of spin-coating a solution of LPP1 with a solid content of 2 weight percent in cyclopentanone, a second alignment layer with a dry thickness of approximately 60 nm was prepared on top of the first LCP layer with the spin parameters of 2000 rpm during 60 s. The alignment layer was subsequently thermally treated on a hot-plate for 10 minutes at a temperature of 180° C. After that, the photo-alignment layer was exposed to LP-UV light (wavelengths between 280 and 320 nm) with the polarisation axis chosen to be perpendicular to the orientation direction of the first alignment layer. A dose of 150 mJ/cm$^2$ was applied at an intensity of 3 mW/cm$^2$.

Then a second layer of polymerizable liquid crystal material was prepared using a 25 weight percent solution of M1 in cyclopentanone. The solution was spin-coated on top of the second alignment layer at 800 rpm for 60 s. A dry film thickness of approximately 800 nm was achieved this way. A thermal treatment at a temperature of 40° C. on a hot-plate was then carried out for duration of 10 minutes.

After that, a patterned radiation curing of the LCP-layer with collimated light through a photo-mask exhibiting a fingerprint pattern was performed. The UV dose was 1000 mJ/cm$^2$ (UVA and UVB) at 8 mW/cm$^2$. The mask was kept at a distance of approximately 15 micron from the surface of the liquid crystalline layer. Then the film was processed as described in the example 5.

The resulting optical element was transparent and no image could be observed in non-polarized light. When the element was arranged between crossed polarizers the fingerprint texture could be seen consisting of two different gray levels.

Example 8

Preparation of a Fingerprint Optical Element Using Photo-Patterning of the Photo-Alignment Layer A solution of the photo-alignment material LPP1 with a solid content of 2 weight percent in cyclopentanone was spin-coated at 2000 rpm for 60 s to a D263 glass plate to form a photo-alignment layer with a dry thickness of approximately 60 nm. The alignment layer was subsequently thermally treated on a hot-plate for 10 minutes at a temperature of 180° C. After that, the photo-alignment layer was twice exposed to LP-UV light (wavelengths between 280 and 320 nm). The first dose of 200 mJ/cm$^2$ was locally applied on the photo-alignment material at an intensity of 3 mW/cm$^2$ using the mask of a fingerprint. In a second step, the mask was removed and the UV-polarisation plane was adjusted at 45° relative to that of the first exposure and a second LP-UV exposure was performed with an energy of 40 mJ/cm$^2$ and an intensity of 3 mW/cm$^2$.

In a next step, a layer of the polymerizable liquid crystal material M2 was prepared on top of the patterned photo-alignment layer. For this, a 40 weight percent solution of M2 in anisole was used spin-coated at 800 rpm for 60 s. A dry film thickness of approximately 1200 nm was achieved this way. A thermal treatment at a temperature of 50° C. on a hot-plate was then carried out for a duration of 10 minutes. After that, a radiation curing was done. For this, the film was exposed to UV light of 500 mJ/cm2 (UVA and UVB) at 50 mW/cm$^2$ under nitrogen.

The resulting optical element was transparent and no image could be observed in non-polarized light. When the element was arranged between crossed polarizers with the edges parallel one of the polarisation axis, the fingerprint texture could be seen with a high contrast as demonstrated by FIG. 2a. Upon rotation of the optical element by 45° the fingerprint pattern appeared with a negative contrast as demonstrated in FIG. 2b.

When rotating the device between the crossed polarizers, the contrast of the fingerprint image varies between the positive image and the negative image.

Example 9

Preparation of a Fingerprint Optical Element by Inkjet Printing

The scanned picture of a fingerprint was used as the biometric information to be directly printed as a birefringent pattern by inkjet printing. The digitized biometric information was stored on the hard disk drive of a computer.

A triacetate cellulose (TAC) foil was washed with isopropanol solvent. By means of Kbar coating (wire coating), a hard-coat solution of CrystalCoat™ MP-1175UV from SDC Technologies Inc. with a solid content of 40 weight percent in a solvent blend methylethylketone-toluol (60/40) was coated on the TAC foil, leading to a protective layer with a dry thickness of approximately 2000 nm (wire diameter of 0.08 mm by a speed of 10 m/sec). The protective layer was subsequently thermally treated in an oven for 1 minute at a temperature of 80° C. After that, the protective layer was exposed to UVA and UVB light (wavelengths between 280 and 400 nm). A dose of 200 mJ/cm$^2$ was applied at an intensity of 20 mW/cm$^2$.

On top of the hard coat an alignment layer with a dry thickness of approximately 60 nm was prepared from a solution of LPP1 with a solid content of 2 weight percent in a solvent blend methylethylketone-cyclohexanone (80/20) by Kbar coating (coating bar with wire diameter of 0.05 mm, speed of 10 m/sec).

The alignment layer was subsequently thermally treated in an oven for 2 minutes at a temperature of 80° C. After that, the photo-alignment layer was exposed from the normal direction to LP-UV light (wavelengths between 280 and 320 nm). A dose of 100 mJ/cm$^2$ was applied at an intensity of 3 mW/cm$^2$.

On top of the alignment layer the pattern of the stored biometric information was printed with the polymerizable liquid crystal mixture M2 in a 20 wt % (weight %) concentrated in MIBK. A modified desktop printer, DCP-115C from Brother Company based on drop-on-demand piezo technology was used for that purpose.

The distance between the print head and substrate during the printing was maximally 1 mm. A resolution of 600 dpi was chosen. Other printer parameters were:
Paper type: Normal paper
Quality of printing: optimal
Printing mode: both directions (from right to left and from left to right)
Colour: colour level After printing, a thermal treatment at a temperature of 50° C. in an oven was carried out for a duration of 10 minutes. After that, a radiation curing was done. For this, the film was exposed to UV light with 500 mJ/cm2 (UVA and UVB) at 3 mW/cm$^2$ under nitrogen.

After above processes the foil comprising the coatings was still transparent and the printed pattern could not be seen in non-polarized light. After arranging the optical element between crossed polarizers with the orientation direction of the LPP layer at 45° to the polarisation axis of the polarizers, the fingerprint texture could be seen with high contrast, Example 10

Preparation of a Signature Optical Element Using Photo-Patterning of the Photo-Alignment Layer A signature was directly written to a fused silica glass plate with a black ink (black marker Artline854 from Shachihata).

As in example 4 an alignment layer and a layer of polymerizable liquid crystals was prepared using the same parameters as in example 4. The above plate comprising the signature was then used as a photomask to transfer the signature into the liquid crystal layer. Every other step and the related parameters were the same as in example 4.

The resulting optical element was transparent and the signature could not be seen in non-polarized light. After arranging the optical element between crossed polarizers with the orientation direction of the LPP layer at 45° to the polarisation axis of the polarizers, the signature could be seen with high contrast.

Example 11

Preparation of a Signature Optical Element Writing with a Pen Filled with Polymerizable Liquid Crystal Material on Top of an Alignment Layer An alignment layer was prepared on a TAC film in the same way as in example 9.

A pen was filled with 30% solution of M2 in cyclopentanone instead of the normal ink. A signature was directly written on the alignment layer on the triacetate film using this pen.

After writing the signature the sample was annealed at a temperature of 50° C. in an oven during 10 minutes. After that, a radiation curing was done: the film was exposed to UV light of 500 mJ/cm2 (UVA and UVB) at 3 mW/cm$^2$ under nitrogen. The thickness of the layer, which had the form of the signature, was determined to about 1.5 μm.

The substrate comprising the liquid crystal signature was still transparent and the signature could not be seen in non-polarized light. However, the signature could be seen bright on a dark background when the substrate was arranged between crossed polarizers, as is demonstrated in FIG. 3. When one of the polarizers was rotated by 90°, the contrast of the image was inversed, leading to a dark appearance of the signature on bright background.

When the substrate was placed on a metallic reflector, the signature could be observed with a single polarizer arranged between the observer and the substrate.

Example 12

Preparation of a Signature Optical Element Writing with a Pen Filled with LCP on an Alignment Layer Comprising an Orientation Pattern An alignment layer was coated on a triacetate foil comprising a hard coat layer following the related processes of example 9. Instead of inducing a uniaxial alignment an orientation pattern in the LPP layer was generated by the double exposure process described in example 8 using a chromium photomask comprising a line pattern with 100 μm line width and 100 μm gap between the lines instead of the fingerprint photomask.

Like in example 11, handwriting using a pen filled with the liquid crystal solution was performed on the substrate comprising the patterned alignment layer.

After writing, the sample was annealed and cured like in example 11.

The substrate comprising the liquid crystal signature was still transparent and the signature could not be seen in non-polarized light. However, the signature could be seen bright on a dark background, as demonstrated in FIG. 4a, when the substrate was arranged between crossed polarizers. The orientation pattern induced in the alignment layer could be recognized by naked eyes, although it was very small. When observed in a polarizing microscope, it could easily be seen, that the micropattern was adapted in the corresponding areas of the signature. For best observation, the substrate was adjusted by rotation for maximum contrast of the pattern. The lines of the handwriting appeared interrupted by the line originating from the photomask used for exposure of the alignment layer, as demonstrated in FIG. 4b. When either substrate or both, polarizer and analyzer, were rotated by 45°, the contrast of the black and white pattern inside the lines of the handwriting was inverted, as demonstrated in FIG. 4c. The inversion of the contrast in FIG. 4c can easily be observed at a position of a defect, one of which is inside the rectangles in FIGS. 4b and 4c, which were drawn for easier recognition.

Example 13

Preparation of a Signature Optical Element Writing with a Pen Filled with LCP on an Alignment Layer Comprising a Tilt Orientation Pattern The example follows the description of parameters of example 12, except that a tilt pattern was generated instead of an azimuthal orientation pattern. A tilt angle can be induced in the LPP material by oblique LP-UV exposure, which is a known method in the art. The LPP layer was irradiated through the mask from an oblique angle of +45° with regard to the normal of the substrate. The polarization plane of the LP-UV light was parallel to the incidence plane of the light. After exposure, the mask was removed and the substrate with the LPP layer was turned in the opposite direction so that the normal to the plate and the UV incidence direction formed an angle of −45°. The subsequent second exposure was made without a mask. Handwriting with the liquid crystal and the other process steps were the same as in example 12.

When the resulting optical element was observed between crossed polarizers, the signature was observed as in example 12. As long as the substrate was viewed from a normal direction the line pattern applied to the alignment layer in form of a tilt pattern could not be seen. However, when the substrate was tilted around an axis perpendicular to the azimuthal orientation direction, a line pattern with bright and dark zones inside the handwriting was clearly visible. When the sample was tilted in the opposite direction the complementary pattern was obtained.

Example 14

Preparation of a Signature Optical Element Writing with a Pen Filled with a Dichroic LCP Formulation on a Patterned Alignment Layer Based on Azimuthal Variation Mainly all the process steps of example 12 were applied, except that dichroic formulation M3 was used in the pen instead of M2 and that the polarisation direction of the LP-UV was rotated by 90° for the second LP-UV exposure step instead of 45°.

After finishing all the process steps, the signature could already be seen in non-polarized light, since the dichroic liquid crystal material absorbs visible light. However, the line pattern induced in the alignment layer could not be seen as long as viewed from a normal direction to the substrate. When the signature was observed with a polarizer on top of the substrate, the line pattern could be recognized inside the handwriting.

When the substrate was observed again without a polarizer in front and the substrate was tilted around an axis parallel to one of the two orientation directions of the orientation pattern, the line pattern inside the handwriting could again be recognized. When the substrate was tilted around an axis parallel to the other orientation direction, the contrast of the line pattern was inverted.

Since the line pattern can be made visible with and without a polarizer, the optical element of this example has both first and second level security feature.

Example 15

Preparation of a Signature Optical Element Writing with a Pen Filled with a Dichroic LCP Formulation on a Patterned Alignment Layer Based on Tilt Variation The process steps of example 13 were applied, except that dichroic formulation M3 was used in the pen instead of M2. After finishing all the process steps, the signature could already be seen in non-polarized light, since the dichroic liquid crystal material absorbs visible light. However, the line pattern induced in the alignment layer could not be seen as long as viewed from a normal direction to the substrate.

When the substrate was tilted around an axis perpendicular to the azimuthal orientation directions induced in the LPP layer, the line pattern inside the handwriting could be recognized. When the substrate was tilted in the opposite direction the contrast of the line pattern was inverted.

When the signature was observed through a polarizer and the polarizer was rotated around an axis normal to the substrate, the intensity of the signature color varied periodically.

Since the line pattern can be made visible without a polarizer, the optical element of this example exhibits a first level security feature. The second level security feature is available be observation through the polarizer.

The invention claimed is:

1. A method for the preparation of a patterned liquid crystal polymer layer containing biometric information for the purpose of identification and/or prevention of forgery or copying, comprising
    providing a substrate
    handwriting to the substrate with a pen or stylus, characterized in that a polymerizable or polymerized liquid crystalline material is used as an ink, wherein the substrate has an aligning surface.

2. A method according to claim 1, wherein the aligning surface exhibits weak alignment capability, such that the liquid crystal ink is aligned by the shearing force applied during handwriting.

3. A method according to claim 2, wherein the ink is in a liquid crystal phase before or immediately after handwriting is performed.

4. A method according to claim 1, wherein the aligning surface comprises an orientation pattern.

5. A method according to claim 1, wherein the aligning surface comprises a pattern of different tilt angles.

6. A method according to claim 5, wherein the aligning surface comprises a pattern of opposite tilt angles.

7. A method according to claim 4, wherein the pattern comprises microtext or a logo or graphics.

8. A method according to claim 4, wherein the pattern has the form of a line pattern.

9. A method according to claim 1, wherein the liquid crystal material contains a dichroic dye.

10. A method according to claim 1, wherein the liquid crystal material contains a fluorescent dye.

11. A method according to claim 1, wherein the handwriting represents a signature.

12. A method according to claim 4, wherein the aligning surface comprises a pattern of different tilt angles.

13. A method according to claim 5, wherein the pattern comprises microtext or a logo or graphics.

14. A method according to claim 6, wherein the pattern comprises microtext or a logo or graphics.

15. A method according to claim 5, wherein the pattern has the form of a line pattern.

16. A method according to claim 6, wherein the pattern has the form of a line pattern.

17. Optical element comprising a patterned liquid crystal polymer layer produced according to the method of claim 1.

18. A method of using an optical element, comprising providing an optical element according to claim 17 as a security element in a security device.

19. A method according to claim 18, wherein a reflector is arranged behind the optical element.

* * * * *